(12) United States Patent
Zelek et al.

(10) Patent No.: US 8,522,768 B2
(45) Date of Patent: Sep. 3, 2013

(54) BARBECUE GRILL ASSEMBLY

(75) Inventors: Leonard G. Zelek, Chicago, IL (US); Adrian A. Bruno, Rolling Meadows, IL (US)

(73) Assignee: Weber-Stephen Products Co., Palatine, IL (US)

( * ) Notice: Subject to any disclaimer, the term of this patent is extended or adjusted under 35 U.S.C. 154(b) by 2171 days.

(21) Appl. No.: 10/942,731

(22) Filed: Sep. 16, 2004

(65) Prior Publication Data

US 2006/0054156 A1 Mar. 16, 2006

(51) Int. Cl.
*F24B 3/00* (2006.01)

(52) U.S. Cl.
USPC .................... 126/25 R; 126/39 B; 126/41 R

(58) Field of Classification Search
USPC ................ 126/25 R, 39 B, 41 R, 30, 40, 8
See application file for complete search history.

(56) References Cited

U.S. PATENT DOCUMENTS

| 2,787,260 | A | * | 4/1957 | Williams | 126/8 |
| 4,402,300 | A | | 9/1983 | Houck | |
| 5,333,596 | A | | 8/1994 | Clifford | |
| 5,411,011 | A | | 5/1995 | Teta | |
| 6,705,307 | B2 | * | 3/2004 | Alden et al. | 126/41 R |
| 6,739,330 | B1 | * | 5/2004 | Ross | 126/41 R |
| 6,923,172 | B2 | * | 8/2005 | Muldoon | 126/8 |

* cited by examiner

*Primary Examiner* — Alfred Basichas
(74) *Attorney, Agent, or Firm* — David I. Roche; Omar Galaria; Baker & McKenzie LLP

(57) ABSTRACT

The present invention provides a support frame assembly for a firebox for a built-in gas barbecue grill assembly having a work structure. The support frame assembly has a first end substantially adjacent the firebox and a second end substantially adjacent a floor supporting the built-in grill assembly. In one embodiment the support assembly has a first mating member for supporting the firebox, and a second mating member for mating with the work structure to connect the support frame assembly to the work structure.

28 Claims, 7 Drawing Sheets

BARBECUE GRILL ASSEMBLY

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a built-in barbecue grill assembly. More specifically, the present invention relates to a support assembly for a firebox of a built-in barbecue grill assembly.

BACKGROUND OF THE INVENTION

Over the past few decades the popularity of gas barbecue grills and gas outdoor cooking devices has increased tremendously. Such barbecue grills may be connected to a cart assembly and thus moveable between various locations, or the barbecue grills may be incorporated into or connected to a fixed or built-in structure.

Conventional barbecue grills include a firebox and a portable frame assembly that supports the firebox. Typically, the firebox is a cooking chamber that has a cast bottom and a cast cover. In general terms, the frame assembly includes a plurality of frame members including vertical, horizontal, and transverse members. The base of the firebox typically rests on and is supported along its entire width by the transverse members. A plurality of bolts extend upwardly from the transverse members to secure the firebox to the transverse members. While such systems according to the prior art provide a number of advantageous features, they nevertheless have certain limitations.

Recently, more permanent or fixed structures have been erected to support the firebox. The more permanent structures are sometimes referred to as a built-in structure. Typically, the more permanent structures incorporate masonry and various cabinetries. Often, however, like the conventional portable barbecue grill frame assemblies, the more permanent structures also include various transverse members. Moreover, the firebox for the more permanent structure similarly rests on and is supported along its entire width by the transverse members. Accordingly, while such more permanent systems according to the prior art provide a number of advantageous features, they also nevertheless have certain limitations.

The present invention seeks to overcome certain of these limitations and other drawbacks of the prior art, and to provide new features not heretofore available.

SUMMARY OF THE INVENTION

The present invention relates generally to a support assembly for supporting a barbecue firebox in a built-in gas barbecue grill assembly having a work structure. According to one embodiment, the support assembly generally comprises a frame assembly having a first end and a second end, the first end being generally adjacent the work structure, and the second end being generally adjacent the floor member.

According to another embodiment, the support assembly comprises a first frame member, a second frame member and a connection member. The first frame member has a first end, a second end, and a first mating portion for mating with the barbecue firebox for the built-in gas barbecue grill. The first end of the first frame member is adjacent the barbecue firebox and the second end of the first frame member is generally adjacent the floor member. The second frame member has a first end, a second end, and a first mating portion for mating with the barbecue firebox for the built-in gas barbecue grill. The first end of the second frame member is adjacent the barbecue firebox and the second end of the second frame member is generally adjacent the floor member. The connection member joins the first and second frame members.

According to another embodiment, the first and second frame members comprise side panels, and a back panel is provided that extends between the first frame member and the second frame member. The back panel forms a back wall of the support frame assembly. In one embodiment, the back panel extends from a height generally adjacent the first end of the first and second frame members to a distance generally adjacent the second end of the first and second frame members.

According to another embodiment, the support frame assembly further comprises a bottom shelf and a cavity. The bottom shelf extends between the first and second frame members and transverse to the back panel, and the cavity is located between the bottom shelf, the first and second frame members and the back panel.

According to another embodiment, the support frame assembly has a door assembly providing access to the cavity of the support frame assembly. In one embodiment the door assembly comprises a door and a hinge member. The door rotates about the hinge member to move from a first position, wherein the door is in the closed position, to a second position, wherein the door is open and the cavity is accessible. In a preferred embodiment the hinge member comprises a shaft extending between the bottom shelf and the connection member.

According to another embodiment, the support frame assembly has a variety of vents. One vent comprises a vent plate adjacent a front of the assembly. Another vent comprises a plurality of vent apertures in the first and second frame members. The vent apertures provide venting from a cavity of the frame assembly into a cavity of adjacent work structures. Another vent is provided between a rear of the firebox and a back panel of the support frame. In such a vent, a venting chamber extends from beneath the bottom shelf to adjacent and upward along the back panel. A vent for the venting chamber is provided between a rear of the firebox and the back panel of the support frame.

According to another embodiment, the first and second frame members have a second mating portion for mating with the work structure of the built-in gas barbecue grill. In one embodiment, the second mating portion comprises a lip adjacent a top thereof. The lip assists in supporting the frame structure on the adjacent work structure.

According to another embodiment, the first mating portion of the first and second frame members engages a mounting ledge of the barbecue grill firebox to support the barbecue grill firebox.

According to another embodiment, the support assembly for supporting a firebox for a built-in gas barbecue grill assembly comprises a frame assembly having a first end, a second end, a mating portion for supporting the barbecue firebox for the built-in gas barbecue grill, and a second mating portion for mating with the work structure of the built-in gas barbecue grill. In one embodiment, the first end of the frame assembly is adjacent the barbecue firebox, and the second end of the frame assembly extends from the firebox to a distance generally adjacent a bottom of the built-in gas barbecue grill assembly.

According to yet another embodiment, a built-in gas barbecue grill assembly comprises a firebox, a support frame assembly and a work structure. The firebox has a pair of opposed end walls. A first of the opposed end walls has a first mounting assembly extending therefrom, and a second of the opposed end walls having a second mounting assembly extending therefrom. The support frame assembly has a mating member engaging the first mounting assembly of the firebox, and another mating member engaging the second mounting assembly of the firebox to support the firebox. The support frame extends from adjacent the firebox to a position distal the firebox. The support frame assembly is mounted to the work structure.

Other features and advantages of the various preferred embodiments of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE INVENTION

Figure 1:
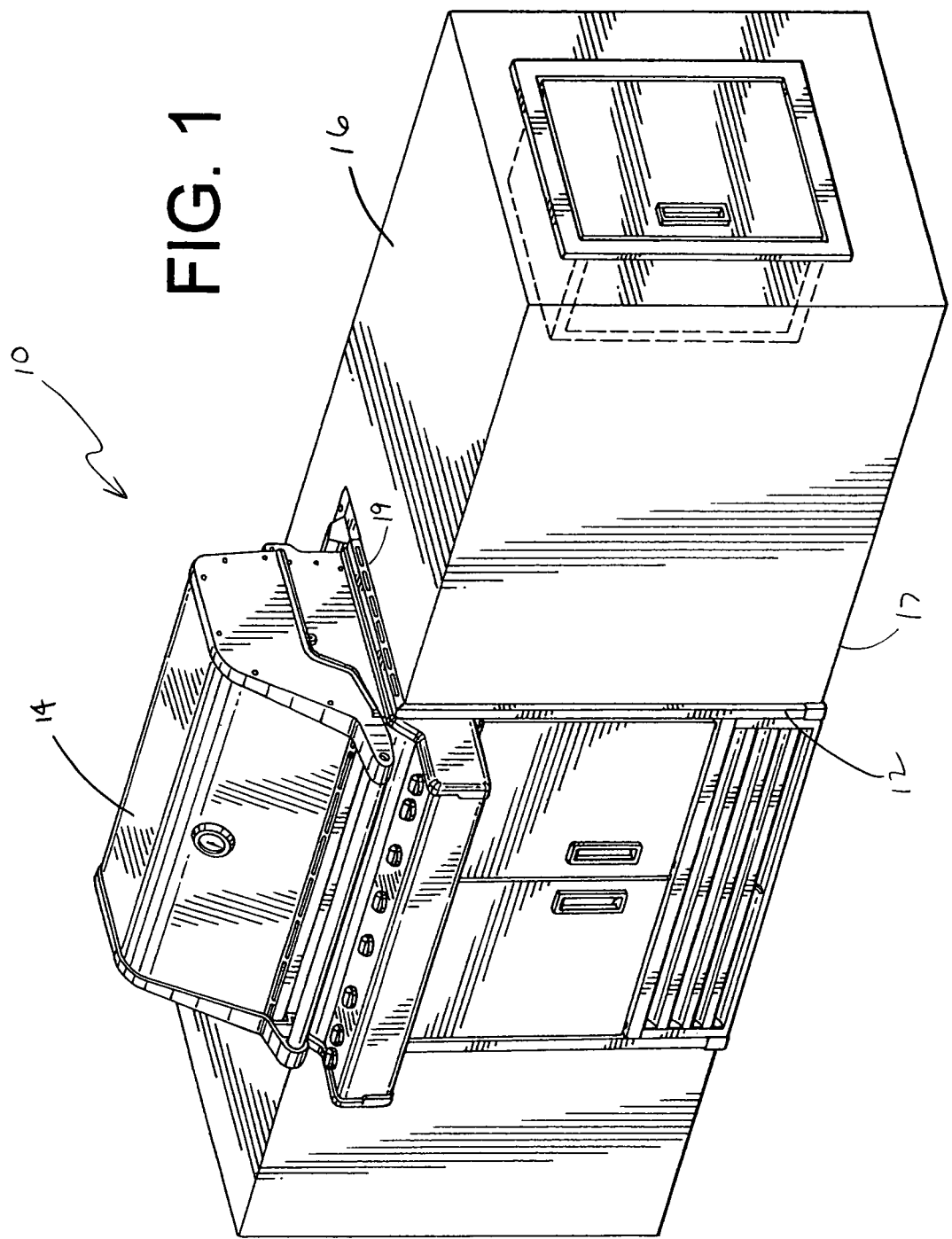
FIG. 1 is a perspective view of a barbecue grill assembly incorporating a support frame assembly for the grill firebox.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to the figures, and specifically to FIG. 1, there is shown a built-in barbecue grill assembly 10. The built-in barbecue grill assembly 10 generally comprises a non-portable support frame assembly 12, a firebox 14, and a work structure 16. The firebox 14 is supported by the support frame assembly 12, and in a preferred embodiment the support frame assembly 12 is supported by the work structure 16. In one embodiment the work structure 16 is a permanent island that partially surrounds the support frame assembly 12 and firebox 14. The permanent work structure 16 is generally a structure that is framed out to allow the support frame assembly 12 to be fitted therewith and connected thereto. In an alternate embodiment, the work structure 16 comprises one or more moveable structures that can join the support frame assembly 12 and firebox 14. The built-in barbecue grill assembly 10 is generally supported on a floor 17, which is typically the ground, a deck or some other outside flooring or support structure.

Figure 2:
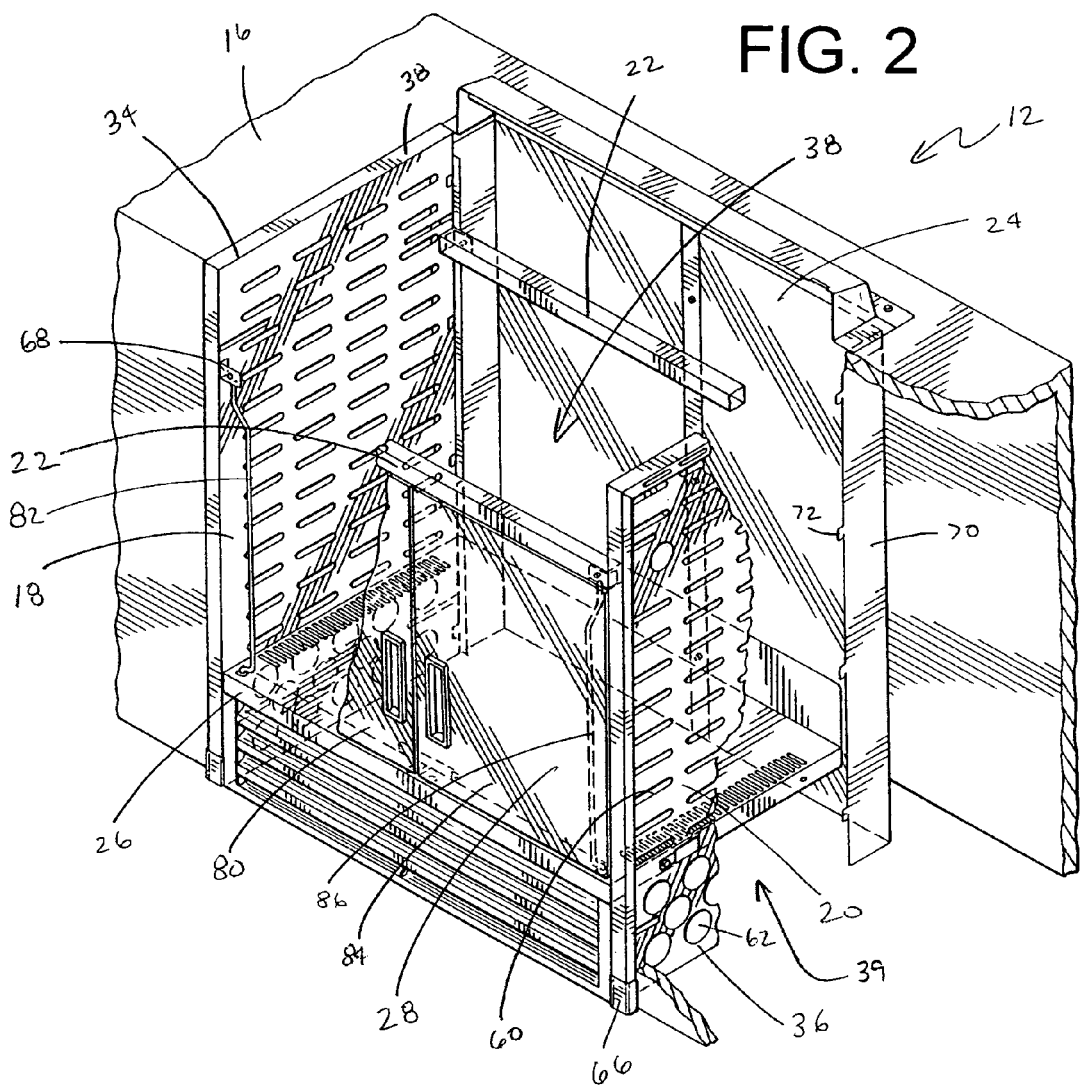
FIG. 2 is a perspective view of the support frame assembly of FIG. 1.
Figure 3:
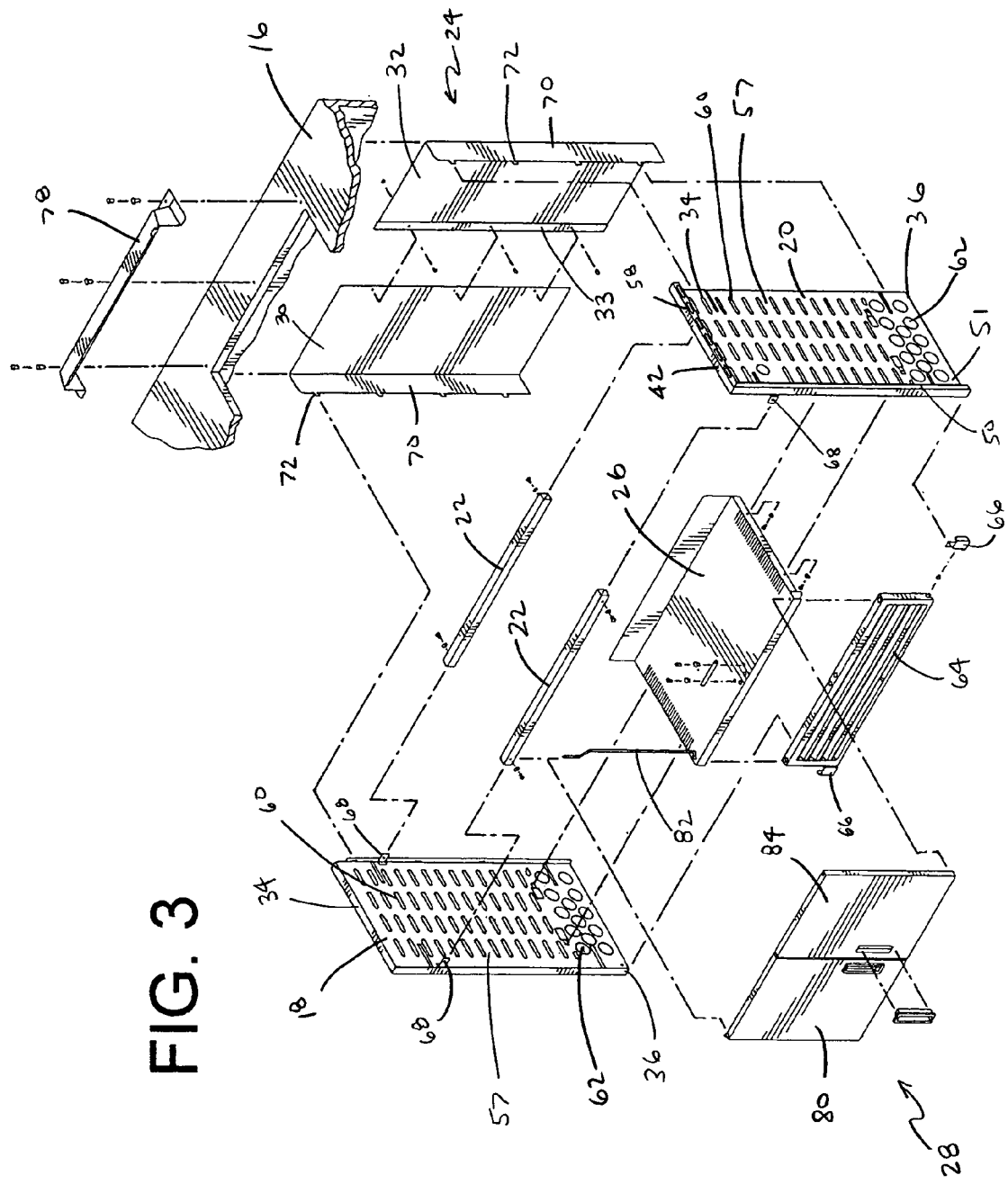
FIG. 3 is an exploded view of the support frame assembly of FIG. 2.

The support frame assembly 12 of a preferred embodiment is best shown in FIGS. 2 and 3. In this embodiment, the support frame assembly 12 generally comprises: a first frame member 18, a second frame member 20, a pair of connection members 22 extending between the first and second frame members 18, 20, a back panel 24 extending between the first and second frame members 18, 20, a shelf 26 extending between the first and second frame members 18, 20 and transverse to the back panel 24, and a door assembly 28 at a front of the frame assembly 12. As such, the support frame assembly 12 generally comprises a sleeve that can be inserted into connection with the work structure 16. The first frame member 18 is generally a mirror image of the second frame member 20. Further, the first and second frame members 18, 20 generally comprise the side panels of the completed support frame assembly 12 as shown in FIGS. 2 and 3. In the preferred embodiment, the back panel 24 comprises a first back panel 30 and a second back panel 32. Like the first and second frame members 18, 20, the first back panel 30 is generally a mirror image of the second back panel 32, except for the connection between the two panels 30, 32. The first back panel 30 is secured to the second back panel 32 at an offset 33 of the second back panel 32 with a plurality of fasteners, such as screws, to form the overall back panel 24. In general, the support frame assembly 12 is configured to provide support to the firebox 14, as well as to provide a cabinet for the built-in barbecue grill assembly 10.

In a preferred embodiment, the support frame assembly 12 has a first end 34 generally adjacent a top of the work structure 16, and a second end 36 generally adjacent the floor member 17. Additionally, in a preferred embodiment, the first end 34 of the support frame assembly 12 is adjacent the barbecue firebox 14, and the second end 36 of the frame assembly 12 extends from adjacent the firebox 14 to a distance generally adjacent a bottom of the built-in gas barbecue grill assembly 10. More specifically, referring to FIGS. 2 and 3, the first frame member 18 has a first end 34 and a second end 36, and the second frame member 20 has a first end 34 and a second end 36. The first end 34 of the first and second frame members 18, 20 is generally adjacent a top of the work structure 16, and the second end 36 of the first and second frame members 18, 20 is generally adjacent the floor member. Similarly, the back panel 24 extends from a height generally adjacent the first end 34 of the first and second frame members 18, 20, to a distance generally adjacent the second end 36 of the first and second frame members 18, 20.

By providing a support frame assembly 12 with a first end 34 generally adjacent the top of the work structure 16 and a second end 36 generally adjacent the floor member 17, a cabinet 38 is defined therebetween. The cabinet area 38 is generally under the firebox and defined as the area between the first and second frame members 18, 20, the back panel 24, and the bottom shelf 26 and the door assembly 28. The door assembly 28 provides access to the cavity of the support frame assembly 12 through the doors 80, 84 thereof. A first vent area 39 is provided beneath the shelf 26 and between the first and second frame members 18, 20 and the back panel 24.

Figure 4:
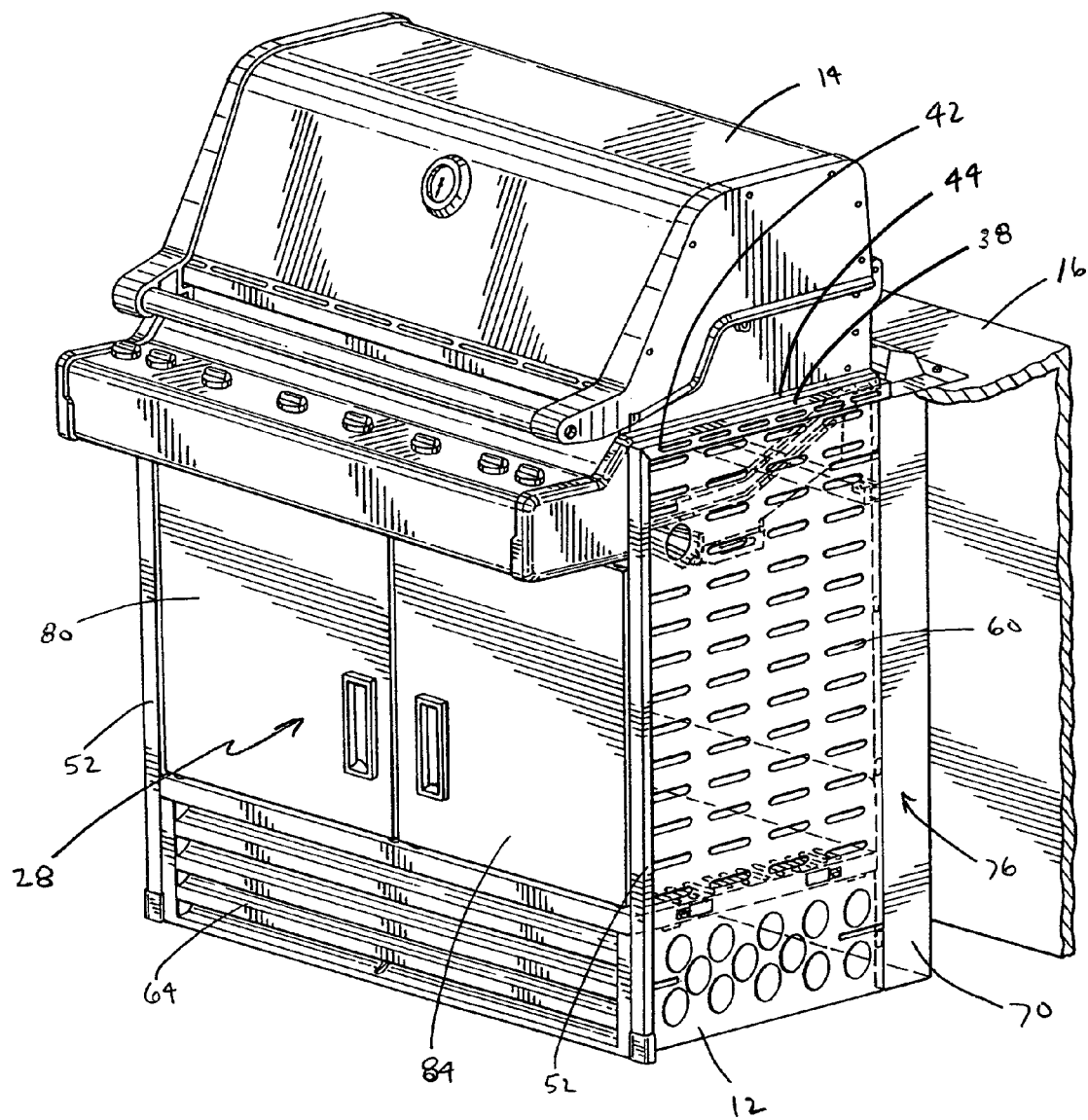
FIG. 4 is perspective view of the firebox and the support frame assembly of FIG. 1.
Figure 5:
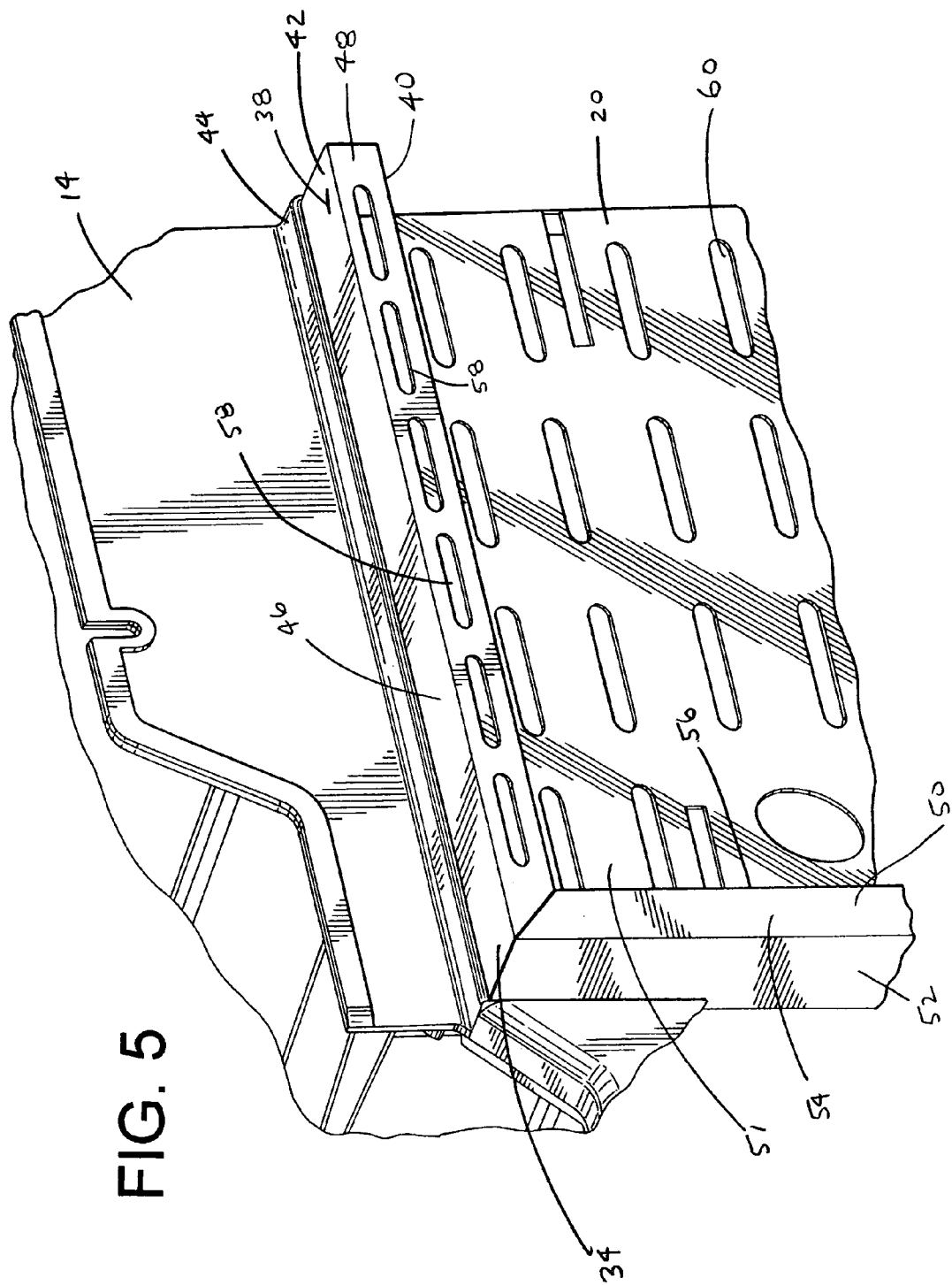
FIG. 5 is a partial perspective view of FIG. 4, showing the engagement between the firebox and the support frame assembly.
Figure 6:
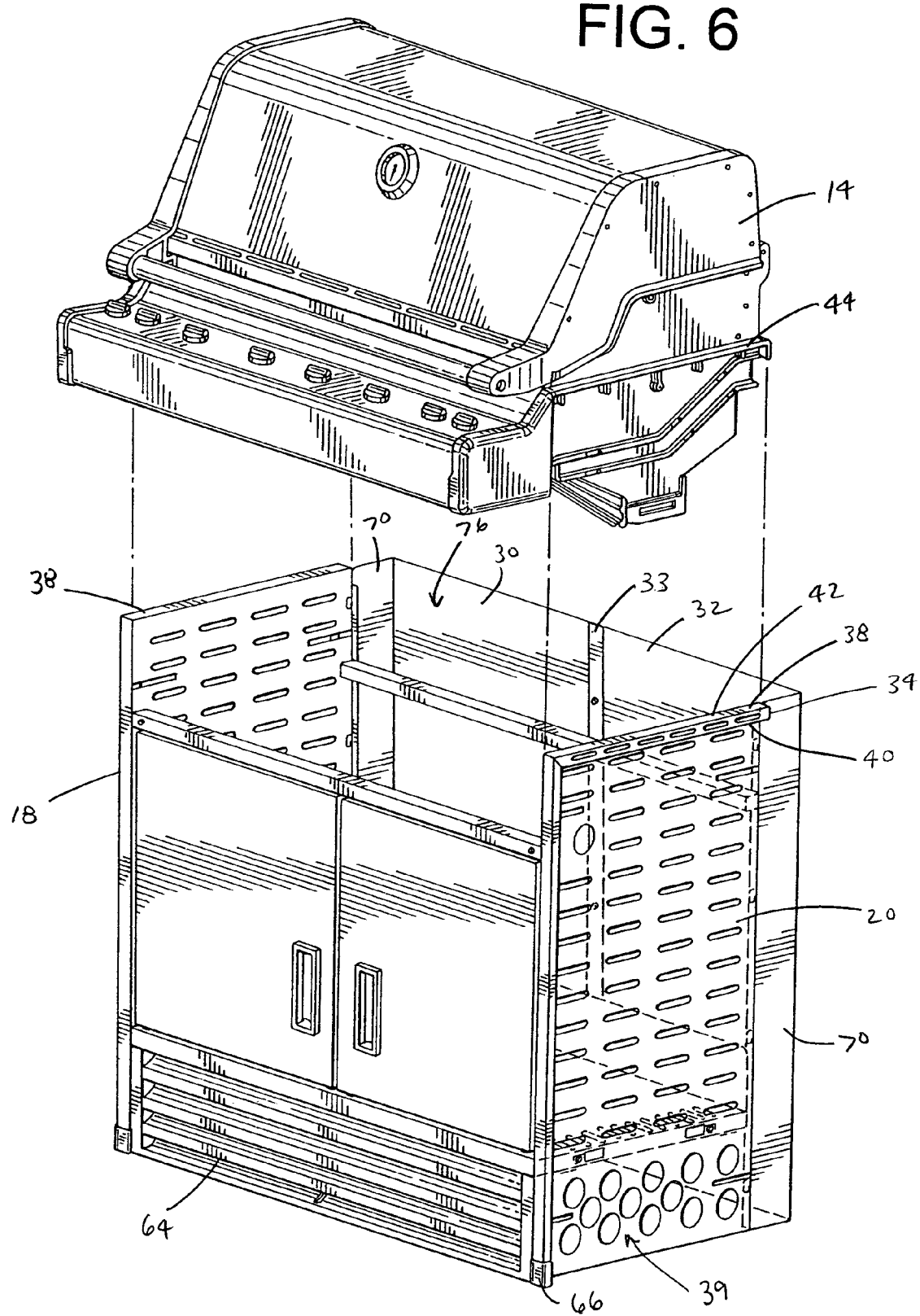
FIG. 6 is a partial perspective view of FIG. 4, showing the disengagement between the firebox and the support frame assembly; and, FIG. 7 is a partial top view of the barbecue grill assembly of FIG. 1.
Figure 7:
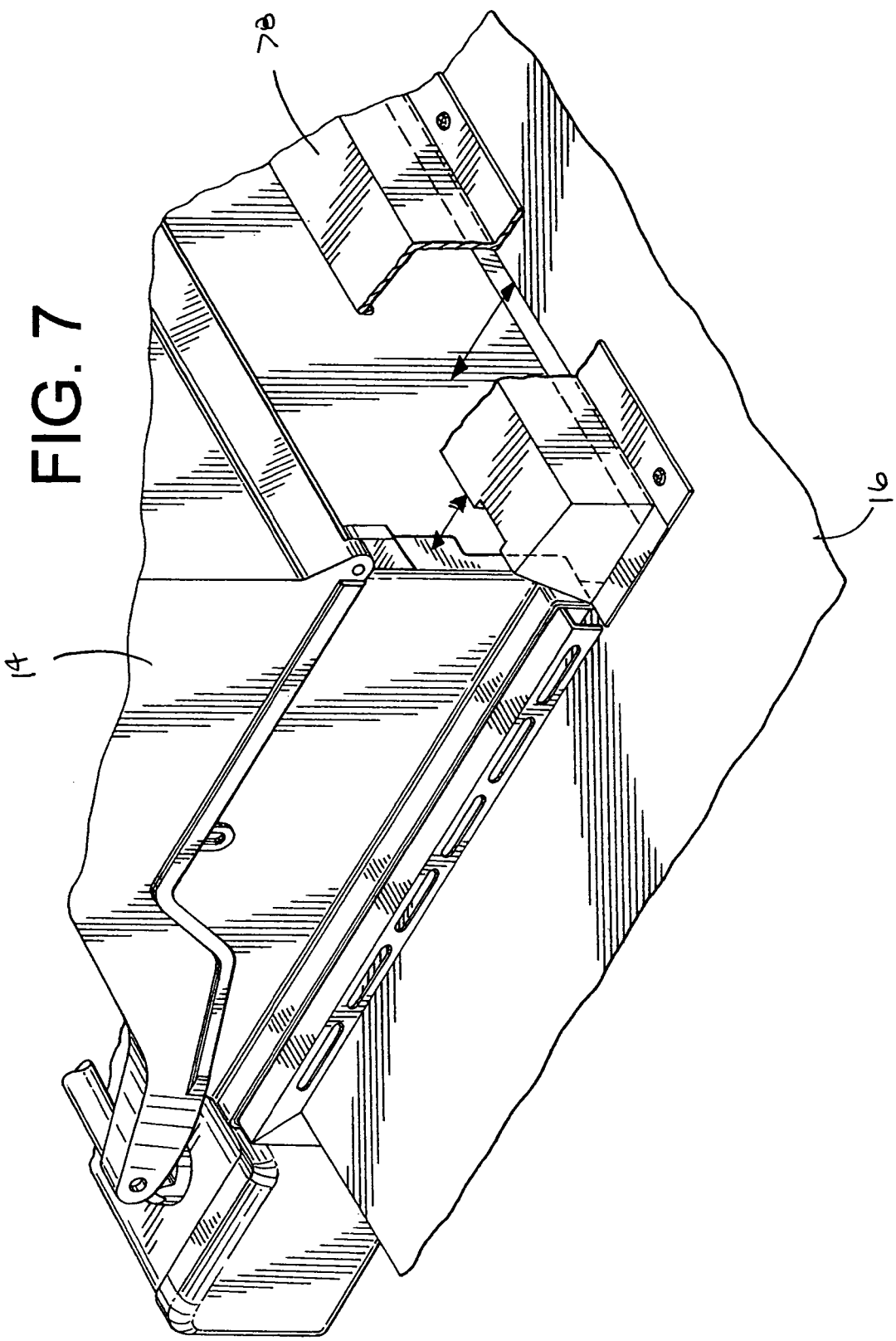

Referring to FIGS. 4-6, the first and second frame members 18, 20 have a first mating portion 38 for mating with the barbecue grill firebox 14. In a preferred embodiment, the first and second frame members 18, 20 have a first lip or flange 42 that extends from their first ends 34, respectively. In this embodiment the first mating portion 38 generally comprises a surface 38 of the lip 42 that engages a mounting assembly 44, preferably a mounting ledge 44, of the barbecue grill firebox 14 to support the barbecue grill firebox 14. As best shown in FIG. 5, a first opposed end wall of the firebox 14 has a first mounting assembly 44 extending therefrom, and a second opposed end wall of the firebox 14 has a second mounting assembly 44 extending therefrom. The first mating portion 38 of the frame assembly 12 engages the mounting assemblies 44 extending from the firebox 14 to support the firebox 14. As such, the first end 34 of the first and second frame members 18, 20 is generally adjacent the barbecue grill firebox 14, and the opposing end of the frame members 18, 20 extend distal the firebox 14.

The first and second frame members 18, 20 also have a second mating portion 40 for mating with the work structure 16 of the built-in gas barbecue grill 10 to assist in supporting the frame assembly 12 on the adjacent work structures 16. In a preferred embodiment, the second mating portion 40 of the frame members 18, 20 comprises another portion of the lip or flange 42 extending from the first ends 34 of the frame members 18, 20. More specifically, as best shown in FIGS. 5 and 6 and as explained above, the lip 42 has a first transverse portion 46 that comprises the surface 38 of the lip 42 that engages the mounting ledge 44 of the firebox 14, and the lip 42 further has a substantially parallel second portion 48 extending from the first portion 46. An extent of the second portion 48 of the lip 42 is, in one embodiment, the portion of the frame members 18, 20 that generally comprises the second mating portion 40 for mating with the work structure 16 of the built-in grill 10. The second mating portion 40, however, may comprise another component extending from the first and second frame members 18, 20. It is further understood that the second mating portion 40 of the frame members 18, 20 may also comprise a second lip or flange 50 extending from a front 51 of the frame members 18, 20. Like the first lip 42 extending from the first ends 34 of the frame members 18, 20, the second lip 50 extending from the front 51 of the frame members 18, 20, in the preferred embodiment, has a first transverse portion 52 and a second substantially parallel portion 54 extending from the first transverse portion 52. An extent 56 of the second portion 54 of the second lip 50 is the portion of the frame members 18, 20 that generally comprises the second mating portion 40 for additionally mating with the work structure 16 of the built-in barbecue grill 10. Thus, through the second mating portion 40 the support frame assembly 12, and thus the firebox 14 resting thereon, is hung or supported by the built-in work structure 16.

The second portion 48 of the lip 42 has a plurality of vent openings 58 therethrough. As explained in detail herein, the openings 58 assist in venting heat from the support frame assembly 12. In a preferred embodiment, the openings 58 comprise a plurality of slots 58 in the wall of the second portion 48 of the second mating portion 40.

As best shown in FIG. 3, the first and second frame members 18, 20 have a sidewall 57 extending between the first end 34, respectively, of the frame members 18, 20 and the second end 36, respectively, of the frame members 18, 20. The sidewall 57 has a plurality of first vent openings 60 in the cabinet portion 38 of the support frame assembly 12, and a plurality of second vent openings 62 in the first vent area 39. The first openings 60 generally vent air from the cabinet area 38 upward and outward the openings 58 in the lip 42 of the frame members 18, 20. Similarly, the second openings 62 generally vent air from the first vent area 39 upward and outward the openings 58 in the lip 42 of the frame members 18, 20. Alternatively, the air and heat may vent out the vent cover 78 adjacent a rear of the firebox 14, as explained in detail below, or the air and heat may vent out of the frame assembly 12 and into a cavity adjacent the work structures 16 and subsequently out therefrom.

A toe kick vent panel or vent plate 64 is also provided beneath the shelf 26 and adjacent a bottom and front of the support frame assembly 12. The vent panel 64 has vents therein to vent air out of the first vent area 39. Brackets 66 are utilized to connect the toe kick vent panel 64 to the frame members 18, 20.

The first and second frame members 18, 20 have mounting brackets 68 extending from the sidewalls 57 thereof. The mounting brackets 68 are utilized to support and affix the connection members 22 that join the first and second frame members 18, 20. The connection members 22 are also referred to as cross rails 22. In a preferred embodiment, there is provided a rear cross rail 22 and a front cross rail 22. The cross rails 22 generally provide support to the support frame assembly 12. Further, the length of the cross rails 22 generally sets the distance between the first and second frame members 18, 20.

The back panel 24 generally extends between the first frame member 18 and the second frame member 20, and thus the back panel 24 forms the back wall of the support frame assembly 12. Both the first and second back panels 30, 32 have flanges 70 with extending tabs 72. The extending tabs 72 engage mating slots 74 in the first and second frame members 18, 20 to secure the back panel 24 to the frame members 18, 20 and as a part of the support frame assembly 12.

As shown in FIGS. 2, 4 and 6-7, a second vent area 76 is provided adjacent the back panel 24. The second vent area 76 extends the distance of the back panel 24 between the first end 34 of the back panel 24 to the second end 36 of the back panel 24. The second vent area 76 has a depth substantially equal to the width of the flanges 70 of the first and second back panel members 30, 32. A vent cover or hood 78 is provided at an exit of the second vent area 76. The vent cover 78 is generally connected to the top of the work structure 16, and adjacent the rear of the firebox 14.

In the preferred embodiment, the first and second vent areas 39, 76 together comprise the venting chamber. Accordingly, the venting chamber extends from the first exit or vent at the toe kick vent panel 64, to beneath the bottom shelf 26 and extending to the second end 36 of the back panel 24, and then upward to the first end 34 of the back panel 24 to the second exit or vent at the vent cover 78. Accordingly, air and heat can vent out of the cabinet area 38 in a plurality of ways: rearward and directly into the second vent area 76, through the first vent openings 60, through openings 27 in the bottom shelf 26 and into the first vent area 39, or through openings at the front of the door assembly 28.

The door assembly 28 generally comprises a first door 80 supported by a first hinge member 82, and a second door 84 supported by a second hinge member 86. The doors 80, 84, independently rotate about their respective hinge members 82, 86, to move from a first position, wherein the door closes the cavity area, to a second position, wherein the door is open and the cavity of the cabinet 38 is accessible. As best shown in FIGS. 2 and 3, in a preferred embodiment the hinge members 82, 86 comprise shafts which extend from the front cross member 22, where one end of the shaft 82, 86 is secured, to the bottom shelf 26, where the other end of the shaft 82, 86 is secured.

It is also understood that a method for assembling the built-in barbecue grill assembly 10 is also disclosed therein. Accordingly, in one embodiment the work structure 16 is fabricated. The work structure 16 may be fabricated by constructing a frame work for the work structure 16. As shown in FIG. 1, the work structure 16 in one embodiment is created with a pocket or indented area 19 into which the assembled support frame assembly 12 can be inserted. An outer surface, such as a brick, tile, etc. is generally applied to the work structure 16. Next, the support frame assembly 12 is assembled, and inserted into the indented area 19 of the work structure 16, and the second mating portion 40 is mated with the work structure 16 to support the frame assembly 12 on the work structures 16. The firebox 14 is then fitted on the frame assembly 12 by mating the mounting assemblies 44 extending from the firebox 14 with the first mating portion 38 of the frame assembly 12.

While the specific embodiments have been illustrated and described, numerous modifications come to mind without significantly departing from the spirit of the invention and the scope of protection is only limited by the scope of the accompanying Claims.

What is claimed is:

1. A built-in gas barbecue grill comprising:
a built-in gas barbecue grill assembly supported on a floor member, wherein the built-in gas barbecue grill assembly includes a work structure;
a non-portable support assembly for a firebox for a built-in gas barbecue grill, the non-portable support assembly, comprising: a frame assembly having a first end and a second end, the first end being generally adjacent a top of the work structure, and the second end being generally adjacent the floor member.

2. The built-in gas barbecue grill of claim 1, wherein the frame assembly has a mating portion for mating with the work structure to connect the frame assembly to the work structure.

3. The built-in gas barbecue grill of claim 1, further comprising a cabinet formed as a part of the frame assembly.

4. A built-in gas barbecue grill comprising:
a built-in gas barbecue grill assembly supported on a floor member;
a non-portable support assembly for a firebox, the non-portable support assembly comprising:
a frame assembly having a first end, a second end, a mating portion supporting the barbecue firebox for the built-in gas barbecue grill, and a second mating portion mating with a work structure of the built-in gas barbecue grill;
the first end of the frame assembly is adjacent the barbecue firebox, and wherein the second end of the frame assembly extends from the firebox to a distance generally adjacent a bottom of the built-in gas barbecue grill assembly;
the second mating portion extending from the first end of the frame assembly whereby the second mating portion rests on top of the working surface of the built-in gas barbecue grill assembly to at least partially support the weight of the frame assembly and the barbecue firebox.

5. The built-in gas barbecue grill of claim 4, wherein the frame assembly comprises a first frame member, a second frame member, and a connection member; both the first frame member and the second frame member providing the mating portion for supporting the barbecue firebox for the built-in gas barbecue grill and the second mating portion for mating with the work structure of the built-in gas barbecue grill; the first frame member defining a left side of the frame assembly and the second frame member defining a right side of the frame assembly, whereby the first and second frame members define an interior space of the frame assembly; the connection member being disposed within the interior space of the frame assembly and attaching at one end to the first frame member and at an opposite end to the second frame member.

6. The built-in gas barbecue grill of claim 4, wherein the frame assembly has a mating portion for mating with the work structure to connect the frame assembly to the work structure.

7. The built-in gas barbecue grill of claim 4, further comprising a cabinet formed as a part of the frame assembly.

8. A built-in gas barbecue grill assembly comprising:
a firebox having a pair of opposed end walls, a first of the opposed end walls having a first mounting assembly extending therefrom, and a second of the opposed end walls having a second mounting assembly extending therefrom;
a support frame assembly having a mating member engaging the first mounting assembly of the firebox, and another mating member engaging the second mounting assembly of the firebox to support the firebox, the support frame extending from adjacent the firebox to a position adjacent a floor supporting the built-in gas barbecue grill assembly, the support frame assembly further having an enclosed cabinet located under the firebox; and
a vent area between a rear of the firebox and a back panel of the support frame assembly.

9. The built-in gas barbecue grill assembly of claim 8, further comprising a work structure of the built-in grill supporting the support frame assembly.

10. A method of creating a built-in barbecue grill, wherein the built-in barbecue grill comprises a built-in gas barbecue grill assembly supported on a floor member and a support frame assembly for supporting a barbecue firebox partially surrounded by a work structure of the built-in gas barbecue grill assembly, the method comprising the steps of:
assembling a built-in barbecue grill work structure; assembling a support frame assembly comprising a plurality of frame members, the support frame assembly having a first mating member for engaging a barbecue grill firebox, and a second mating member;
connecting the assembled support frame assembly to the built-in barbecue grill work structure, the support frame assembly extending from adjacent a top of the built-in barbecue grill work structure generally to a floor; and,
placing the barbecue grill firebox on the first mating member of the support frame assembly.

11. The method of claim 10, further comprising the step of inserting the assembled support frame assembly in an indented area of the built-in barbecue grill work structure.

12. The method of claim 10, wherein the step of assembling a built-in barbecue grill work structure comprises creating a frame work, and attaching an outer surface to the frame work.

13. A built-in gas barbecue grill comprising:
a built-in gas barbecue grill assembly supported on a floor member, wherein the built-in gas barbecue grill assembly includes a work structure;
a support frame assembly for supporting a barbecue firebox partially surrounded by the work structure of the built-in gas barbecue grill assembly, the support frame assembly comprising:
a first, generally vertically oriented frame member having a first end, a second end, and a first mating portion mating with the barbecue firebox for the built-in gas barbecue grill, the first end of the first frame member being adjacent the barbecue firebox, the second end of the first frame member being generally adjacent the floor member, the first mating portion of the first frame member extending transversely from the first end of the first frame member thereby forming a ledge mating with the barbecue firebox;

a second, generally vertically oriented frame member having a first end, a second end, and a first mating portion mating with the barbecue firebox for the built-in gas barbecue grill, the first end of the second frame member being adjacent the barbecue firebox, the second end of the second frame member being generally adjacent the floor member, the first mating portion of the second frame member extending transversely from the first end of the second frame member thereby forming a ledge mating with the barbecue firebox;

wherein at least one of the first and second frame members have a second mating portion mating with the work structure of the built-in gas barbecue grill and connecting the support frame assembly to the built-in barbecue grill work structure; and, a connection member joining the first and second frame members.

14. The support frame assembly of claim 13, wherein the first and second frame members comprise side panels.

15. The support frame assembly of claim 13, further comprising a back panel extending between the first frame member and the second frame member, the back panel forming a back wall of the support frame assembly.

16. The support frame assembly of claim 15, wherein the back panel extends from a height generally adjacent the first end of the first and second frame members to a distance generally adjacent the second end of the first and second frame members.

17. The support frame assembly of claim 15, further comprising a bottom shelf extending between the first and second frame members and transverse to the back panel, and a cavity located between the bottom shelf, the first and second frame members and the back panel.

18. The support frame assembly of claim 17, further comprising a door assembly providing access to the cavity of the support frame assembly.

19. The support frame assembly of claim 18, wherein the door assembly comprises a door and a hinge member, the door rotating about the hinge member to move from a first position, wherein the door is in the closed position, to a second position, wherein the door is open and the cavity is accessible.

20. The support frame assembly of claim 19, wherein the hinge member comprises a shaft extending between the bottom shelf and the connection member.

21. The support frame assembly of claim 13, further comprising a vent plate on a front side of the assembly.

22. The support frame assembly of claim 13, wherein the first and second frame members have a plurality of vent apertures therein, the vent apertures providing venting between a cavity of the frame assembly and a cavity of the adjacent work structure.

23. The support frame assembly of claim 13, further comprising a vent between a rear of the firebox and a back panel of the support frame, the vent communicating with an interior space of the frame assembly, the back panel of the support frame being rearwardly and horizontally displaced from the rear of the firebox whereby the vent has a horizontal width.

24. The support frame assembly of claim 13, wherein the support frame assembly further comprises a back panel extending from the first frame member to the second frame member, a bottom shelf extending between the first and second frame members, and a venting chamber for venting an interior space of the frame assembly extending from beneath the bottom shelf to adjacent and upward along the back panel.

25. The support frame assembly of claim 24, further comprising a vent for the venting chamber between a rear of the firebox and the back panel of the support frame, the back panel of the support frame being rearwardly displaced from the rear of the firebox.

26. The support frame assembly of claim 13, wherein both the first frame member and the second frame member have a second mating portion for mating with the work structure of the built-in gas barbecue grill.

27. The support frame assembly of claim 26, wherein the second mating portion of the first and second frame members comprises a lip adjacent a top thereof, the lip assisting in supporting the frame assembly on the adjacent work structure.

28. The support frame assembly of claim 13, wherein the first mating portion of the first and second frame members engage a mounting ledge of the barbecue grill firebox to support the barbecue grill firebox.

* * * * *